US005864797A

United States Patent [19]
Fujimoto

[11] Patent Number: 5,864,797
[45] Date of Patent: *Jan. 26, 1999

[54] PITCH-SYNCHRONOUS SPEECH CODING BY APPLYING MULTIPLE ANALYSIS TO SELECT AND ALIGN A PLURALITY OF TYPES OF CODE VECTORS

[75] Inventor: Mitsuo Fujimoto, Sakurai, Japan

[73] Assignee: Sanyo Electric Co., Ltd., Mariguchi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 650,830

[22] Filed: May 20, 1996

[30] Foreign Application Priority Data

May 30, 1995 [JP] Japan .................................... 7-131298
May 30, 1995 [JP] Japan .................................... 7-131299

[51] Int. Cl.[6] ........................................ G01L 9/14
[52] U.S. Cl. ........................... 704/223; 704/220; 704/264
[58] Field of Search ................................ 395/2.28, 2.29, 395/2.31, 2.32, 2.3, 2.73, 2.74; 704/200, 214, 206, 207, 220, 223, 264

[56] References Cited

U.S. PATENT DOCUMENTS 4,991,214 2/1991 Freeman et al. ....................... 395/2.32
5,115,469 5/1992 Taniguchi et al. ..................... 395/2.37
5,138,661 8/1992 Zinser et al. ........................... 395/2.28
5,261,027 11/1993 Taniguchi et al. ..................... 395/2.09
5,327,519 7/1994 Haggvist et al. ...................... 395/2.28
5,369,576 3/1995 Miki et al. ............................ 395/2.31
5,488,704 1/1996 Fujimoto ................................ 395/2.28
5,553,194 9/1996 Seza et al. .............................. 395/2.3
5,668,924 9/1997 Takahashi .............................. 704/219

FOREIGN PATENT DOCUMENTS

05108098 A 4/1993 Japan .

*Primary Examiner*—David R. Hudspeth
*Assistant Examiner*—Donald L. Storm
*Attorney, Agent, or Firm*—Beveridge, DeGrandi, Weilacher & Young, L.L.P.

[57] ABSTRACT

A speech coder using a pitch synchronous innovation code excited linear prediction (PSI-CELP) speech coding system. The speech coder is capable of representing a portion which is not sufficiently represented by an adaptive codebook in a periodic portion of input speech and capable of improving the quality of reproduced speech. The periodicity corresponds to the pitch cycle of input speech by preliminarily reproducing speech from simple impulse trains. The speech coder depending on the particular embodiment includes an adaptive code book, a fixed code book, a noise code book, and a pulse codebook. A pulse code book stores a plurality of types of codevectors corresponding to pitch waveforms of voiced sounds. At the time of coding input speech, the pulse code book is searched.

14 Claims, 6 Drawing Sheets

PITCH-SYNCHRONOUS SPEECH CODING BY APPLYING MULTIPLE ANALYSIS TO SELECT AND ALIGN A PLURALITY OF TYPES OF CODE VECTORS

BACKGROUND OF THE INVENTION

1. Field of the Invention

The present invention relates to a speech coder using a CELP (Code Excited Linear Prediction) speech coding system, a PSI-CELP (Pitch Synchronous Innovation Code Excited Linear Prediction) speech coding system, or the like.

2. Description of the Prior Art

In recent years, in order to effectively utilize the radio band of an automobile telephone or a portable telephone and compress the amount of information in a voiced portion in multimedia communication, techniques for low bit-rate speech coding have been in the limelight.

As this type of speech coding system, a CELP speech coding system, a PSI-CELP speech coding system, and the like have been already developed.

The CELP speech coding system is a coding system for reproducing speech by constructing a linear filter corresponding to a spectral envelope of input speech by a linear predictive analysis method and driving the linear filter by a time series codevector stored in a codebook.

The PSI-CELP speech coding system is a system for driving a linear predictive filter utilizing a candidate vector previously prepared in a codebook as an excitation source on the basis of the CELP speech coding system. The PSI-CELP speech coding system is characterized in that the excitation source is caused to have periodicity in synchronization with the cycle of an adaptive codebook corresponding to the pitch cycle of speech.

FIG. 6 illustrates one example of a CELP coder.

A continuous input speech signal is first divided into sections at predetermined spacing of approximately 5 to 10 ms. The spacing is herein referred to as a sub-frame.

The input speech is then subjected to linear predictive analysis for each sub-frame by a linear predictive analysis unit 101, to calculate a linear predictive coefficient of p-th degree $\alpha_i$ (i=1, 2, . . . P). A linear predictive synthesis filter 102 is constructed on the basis of the obtained linear predictive coefficient $\alpha_i$.

An adaptive codebook 103 is then searched. The adaptive codebook 103 is used for representing a periodic component of speech, that is, a pitch.

An output codevector corresponding to an input code to the adaptive codebook 103 is produced by cutting an excitation signal (an adaptive codevector) of the linear predictive synthesis filter 102 in sub-frames from the current sub-frame from its end to a length corresponding to the input code (hereinafter referred to as a lag) and repeatedly arranging an adaptive codevector obtained by the cutting until the length thereof reaches the length of the sub-frame.

The linear predictive synthesis filter 102 is driven using the produced output codevector, to produce reproduced speech. The reproduced speech is multiplied by such gain that the distance between the input speech and the reproduced speech (the distortion of the reproduced speech from the original speech) theoretically reaches a minimum, after which the distance between the input speech and the reproduced speech is calculated by a distance calculating unit 105.

Such an operation is repeated for each input code, whereby a code corresponding to an excitation vector corresponding to reproduced speech at the minimum distance from input speech is selected.

Thereafter, a noise codebook 104 is searched. The noise codebook 104 is used for representing a varying portion of speech which cannot be represented by the adaptive codebook 103. Various codevectors having a length corresponding to one sub-frame generally based on white Gaussian noise (hereinafter referred to as noise codevectors) are previously stored in the noise codebook 104.

A noise codevector corresponding to the input code is read out from the various noise codevectors stored in the noise codebook 104. In order to eliminate the effect of the codevector selected by searching the adaptive codebook, an output obtained by driving the linear predictive synthesis filter 102 using the noise codevector (hereinafter referred to as a synthesis filter output corresponding to the noise codevector) read out is then orthogonalized to a synthesis filter output corresponding to a codevector selected by searching the adaptive codebook, whereby reproduced speech is produced. The reproduced speech is multiplied by such gain that the distance between the input speech and the reproduced speech theoretically reaches a minimum, after which the distance between the input speech and the reproduced speech is calculated by the distance calculating unit 105.

Such an operation is repeated for each input code, whereby a code corresponding to an excitation vector corresponding to reproduced speech at the minimum distance from input speech is selected.

An input code to the adaptive codebook 103 which is selected by searching the adaptive codebook 103 and a code representing gain corresponding thereto, an input code to the noise codebook 104 which is selected by searching the noise codebook 104 and a code representing gain corresponding thereto, and a linear predictive coefficient are outputted as coded signals.

The adaptive codebook 103 efficiently represents a pitch structure of speech in a voiced and stationary portion. In cases such as a case where there is little power of the excitation signal in the preceding sub-frame, a case where the current sub-frame is non-stationary speech in a portion such as a rising portion of speech which is constituted by components different from those in the preceding sub-frame, and a case where the current sub-frame is noise speech in a portion such as a voiceless portion having no pitch cycle, however, the adaptive codebook 103 cannot produce a suitable codevector, thereby degrading the quality of the reproduced speech.

In order to cope with such a problem, a method of preparing a codebook outputting a random component in a complementary manner to the adaptive codebook 103 has been proposed. Such a codebook is called a fixed codebook because it has a structure outputting a codevector in a fixed correspondence with the input code in any sub-frame, similarly to the noise codebook.

The fixed codebook is searched simultaneously with the adaptive codebook, whereby an output vector of either one of the codebooks is exclusively selected in accordance with the minimum distortion standard. Specifically, the adaptive codebook and the fixed codebook are complementary to each other, to operate as one codebook.

A method of causing a noise codevector to have periodicity so as to correspond to the period of an adaptive codevector in order to represent a component which is periodic and cannot be coped with only by components in the preceding sub-frame, that is, a non-stationary component in a voiced portion which cannot be represented by the adaptive codebook as small distortion by the noise codebook has been already proposed.

Since the codevectors stored in the fixed codebook and the noise codebook are codevectors corresponding to noises, however, a portion which is not sufficiently represented by the adaptive codebook in a periodic portion of the input speech cannot, in some cases, be represented even using either method.

SUMMARY OF THE INVENTION

An object of the present invention is to provide a speech coder capable of representing a portion which is not sufficiently represented by an adaptive codebook in a periodic portion of input speech and capable of improving the quality of reproduced speech.

A first speech coder according to the present invention is a speech coder for subjecting input speech to linear predictive analysis to construct a speech synthesis filter, reproducing speech on the basis of codevectors stored in a codebook and the speech synthesis filter, and coding the input speech on the basis of the reproduced speech and the input speech.

In the first speech coder according to the present invention, there is provided a pulse codebook storing a plurality of types of codevectors corresponding to pitch waveforms of voiced sounds. In producing reproduced speech on the basis of the codevector read out from the pulse codebook, reproduced speech corresponding to each of a plurality of types of impulse trains in which impulses are generated at intervals of the pitch cycle of the input speech and differ from each other in the initial position is produced on the basis of the impulse trains and the speech synthesis filter. The impulse train corresponding to the reproduced speech whose distortion from the input speech reaches a minimum is selected. The codevector read out from the pulse codebook is caused to have periodicity on the basis of the selected impulse train.

A second speech coder according to the present invention is a speech coder for subjecting input speech to linear predictive analysis to construct a speech synthesis filter, reproducing speech on the basis of codevectors read out from a codebook including an adaptive codebook storing codevectors corresponding to a past excitation signal and a noise codebook storing codevectors corresponding to noises and the speech synthesis filter, and coding the input speech on the basis of the reproduced speech and the input speech.

In the second speech coder according to the present invention, a pulse codebook storing a plurality of types of codevectors corresponding to pitch waveforms of voiced sounds is provided in a complementary manner to the noise codebook. The pulse codebook is searched simultaneously with the noise codebook, whereby an output vector of either one of the codebooks is exclusively selected in accordance with the minimum distortion standard.

In producing reproduced speech on the basis of the codevector read out from the pulse codebook, reproduced speech corresponding to each of a plurality of types of impulse trains in which impulses are generated at intervals of the pitch cycle of the input speech and differ from each other in the initial position is produced on the basis of the impulse trains and the speech synthesis filter. The impulse train corresponding to the reproduced speech whose distortion from the input speech reaches a minimum is selected. The codevector read out from the pulse codebook is caused to have periodicity on the basis of the selected impulse train.

In a third speech coder according to the present invention, input speech is subjected to linear predictive analysis to construct a speech synthesis filter. A plurality of codevectors are successively cut off by changing the cutting position from an adaptive codebook storing codevectors corresponding to a past excitation signal, and the speech synthesis filter is driven using each of the cut codevectors, to produce reproduced speech corresponding to the cut codevector. The codevector corresponding to the reproduced speech whose distortion from the input speech reaches a minimum is searched for.

The codevectors are successively read out from a noise codebook storing a plurality of types of codevectors corresponding to noises and a pulse codebook storing a plurality of types of codevectors corresponding to pitch waveforms of voiced sounds. On the basis of each of the codevectors read out and the speech synthesis filter, reproduced speech corresponding to the codevector read out is produced. The codevector corresponding to the reproduced speech whose distortion from the input speech reaches a minimum is searched for.

In producing reproduced speech on the basis of the codevector read out from the pulse codebook, reproduced speech corresponding to each of a plurality of types of impulse trains in which impulses are generated at intervals of the pitch cycle of the input speech and differ from each other in the initial position is produced on the basis of the impulse trains and the speech synthesis filter. The impulse train corresponding to the reproduced speech whose distortion from the input speech reaches a minimum is selected. The codevector read out from the pulse codebook is caused to have periodicity on the basis of the selected impulse train.

In a fourth speech coder, input speech is subjected to linear predictive analysis, to construct a speech synthesis filter. A plurality of types of codevectors are successively cut off by changing the cutting position from an adaptive codebook storing codevectors corresponding to a past excitation signal, and the speech synthesis filter is driven using each of the cut codevectors, to produce reproduced speech corresponding to the cut codevector. The distortion of the reproduced speech from the input speech is calculated. From a fixed codebook storing a plurality of types of codevectors, the codevectors are successively read out. The speech synthesis filter is driven using the codevectors read out, to produce reproduced speech corresponding to each of the codevectors read out. The distortion of the reproduced speech from the input speech is calculated. The codevector corresponding to the reproduced speech whose distortion from the input speech reaches a minimum out of the codevectors cut from the adaptive codebook and the codevectors read out from the fixed codebook is selected.

From a noise codebook storing a plurality of types of codevectors corresponding to noises and a pulse codebook storing a plurality of types of codevectors corresponding to pitch waveforms of voiced sounds, the codevectors are successively read out. Reproduced speech corresponding to each of the codevectors read out is produced on the basis of the codevectors read out and the speech synthesis filter. The codevector corresponding to the reproduced speech whose distortion from the input speech reaches a minimum is searched for.

In producing reproduced speech on the basis of the codevector read out from the pulse codebook, reproduced speech corresponding to each of a plurality of types of impulse trains in which impulses are generated at intervals of the pitch cycle of the input speech and differ from each other in the initial position is produced on the basis of the impulse trains and the speech synthesis filter. The impulse train corresponding to the reproduced speech whose distortion from the input speech reaches a minimum is selected. The codevector read out from the pulse codebook is caused to have periodicity on the basis of the selected impulse train.

A fifth speech coder according to the present invention is a speech coder for reproducing speech on the basis of codevectors stored in a codebook and coding, on the basis of the reproduced speech and input speech, the input speech.

In the fifth speech coder according to the present invention, there is provided a pulse codebook storing a plurality of types of codevectors corresponding to pitch waveforms of voiced sounds. In producing reproduced speech on the basis of the codevector read out from the pulse codebook, reproduced speech corresponding to each of a plurality of impulse trains in which impulses are generated at intervals of the pitch cycle of the input speech and differ from each other in the initial position is produced. The impulse train corresponding to the reproduced speech whose distortion from the input speech reaches a minimum is selected. The codevector read out from the pulse codebook is caused to have periodicity on the basis of the selected impulse train.

A sixth speech coder according to the present invention is a speech coder for reproducing speech on the basis of codevectors read out from a codebook including an adaptive codebook storing codevectors corresponding to a past reproduction signal and a noise codebook storing codevectors corresponding to noises, and coding, on the basis of the reproduced speech and input speech, the input speech.

In the sixth speech coder according to the present invention, a pulse codebook storing a plurality of types of codevectors corresponding to pitch waveforms of voiced sounds is provided in a complementary manner to the noise codebook. The pulse codebook is searched simultaneously with the noise codebook, whereby an output vector of either one of the codebooks is exclusively selected in accordance with the minimum distortion standard.

In producing reproduced speech on the basis of the codevector read out from the pulse codebook, reproduced speech corresponding to each of a plurality of impulse trains in which impulses are generated at intervals of the pitch cycle of the input speech and differ from each other in the initial position is produced. The impulse train corresponding to the reproduced speech whose distortion from the input speech reaches a minimum is selected. The codevector read out from the pulse codebook is caused to have periodicity on the basis of the selected impulse train.

In a seventh speech coder according to the present invention, a plurality of codevectors are successively cut off by changing the cutting position from an adaptive codebook storing codevectors corresponding to a past reproduction signal, to produce reproduced speech corresponding to each of the cut codevectors. The codevector corresponding to the reproduced speech whose distortion from the input speech reaches a minimum is searched for.

From a noise codebook storing a plurality of types of codevectors corresponding to noises and a pulse codebook storing a plurality of types of codevectors corresponding to pitch waveforms of voiced sounds, the codevectors are successively read out. Reproduced speech corresponding to each of the codevectors read out is produced. The codevector corresponding to the reproduced speech whose distortion from the input speech reaches a minimum is searched for.

In producing reproduced speech on the basis of the codevector read out from the pulse codebook, reproduced speech corresponding to each of a plurality of types of impulse trains in which impulses are generated at intervals of the pitch cycle of the input speech and differ from each other in the initial position is produced. The impulse train corresponding to the reproduced speech whose distortion from the input speech reaches a minimum is selected. The codevector read out from the pulse codebook is caused to have periodicity on the basis of the selected impulse train.

In an eighth speech coder according to the present invention, a plurality of types of codevectors are successively cut off by changing the cutting position from an adaptive codebook storing codevectors corresponding to a past excitation signal, to produce reproduced speech corresponding to each of the cut codevectors. The distortion of the reproduced speech from the input speech is calculated. From a fixed codebook storing a plurality of types of codevectors, the codevectors are successively read out, to produce reproduced speech corresponding to each of the codevectors read out. The distortion of the reproduced speech from the input speech is calculated. The codevector corresponding to the reproduced speech whose distortion from the input speech reaches a minimum out of the codevectors cut off from the adaptive codebook and the codevectors read out from the fixed codebook is searched for.

From a noise codebook storing a plurality of types of codevectors corresponding to noises and a pulse codebook storing a plurality of types of codevectors corresponding to pitch waveforms of voiced sounds, the codevectors are successively read out, to produce reproduced speech corresponding to each of the codevectors read out. The codevector corresponding to the reproduced speech whose distortion from the input speech reaches a minimum is searched for.

In producing reproduced speech on the basis of the codevector read out from the pulse codebook, reproduced speech corresponding to each of a plurality of types of impulse trains in which impulses are generated at intervals of the pitch cycle of the input speech and differ from each other in the initial position is produced. The impulse train corresponding to the reproduced speech whose distortion from the input speech reaches a minimum is selected. The codevector read out from the pulse codebook is caused to have periodicity on the basis of the selected impulse train.

In the first to eighth speech coders, the pulse codebook storing codevectors corresponding to pitch waveforms of typical voiced sounds is provided in a complementary manner to the noise codebook, whereby a portion which is not sufficiently represented by the adaptive codebook in a periodic portion of input speech can be represented. As a result, the quality of reproduced speech is improved.

The pulse codevector read out from the pulse codebook is caused to have periodicity so as to correspond to the pitch cycle of the input speech on the basis of the results of the search of simple impulse trains, whereby processing time for causing the pulse codevector read out from the pulse codebook to have periodicity is shortened.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
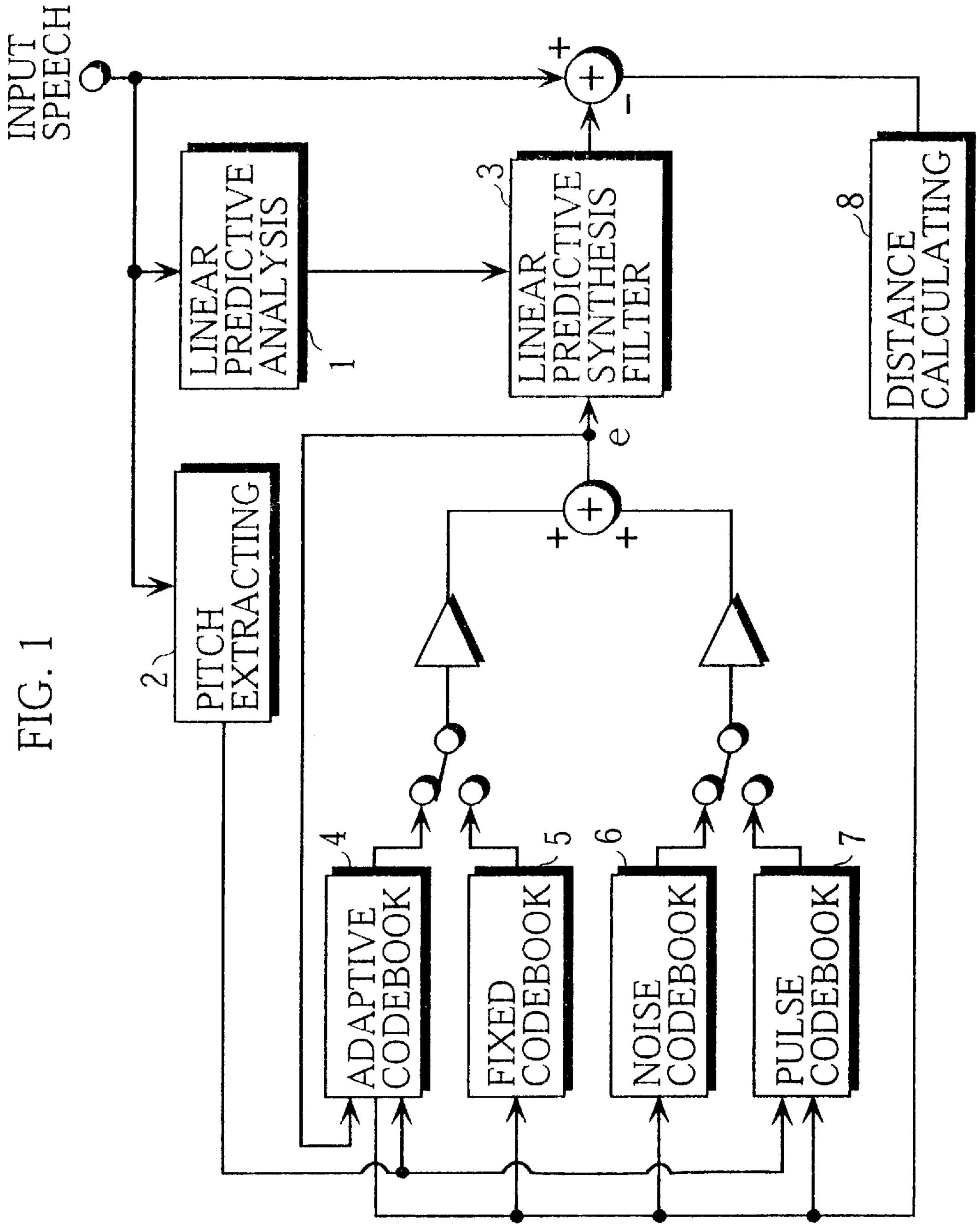
FIG. 1 is a block diagram showing the construction of a speech coder.

Referring now to the drawings, embodiments of the present invention will be described.

FIG. 1 illustrates the construction of a speech coder.

In the speech coder, there are two excitation sources of a linear predictive filter. One of the excitation sources is constituted by an adaptive codebook 4 and a fixed codebook 5, and the other excitation source is constituted by a noise codebook 6 and a pulse codebook 7.

The adaptive codebook 4 is used for representing a periodic component of speech, that is, a pitch, as already described. An excitation signal e (an adaptive codevector), which corresponds to a past predetermined length, of the linear predictive filter is stored in the adaptive codebook 4.

The fixed codebook 5 is provided for complementing the adaptive codebook 4 in cases such as a case where the excitation signal has little power in the preceding sub-frame, a case where the current sub-frame is non-stationary speech in a portion such as a rising portion of speech which is constituted by components different from those in the preceding sub-frame, and a case where the current sub-frame is noise speech in a portion such as a voiceless portion having no pitch cycle, as already described. Various codevectors (fixed codevectors) having a length corresponding to the length of the sub-frame are stored in the fixed codebook 5.

The noise codebook 6 is used for representing a non-periodic component of speech, as already described. Various codevectors (noise codevectors) having a length corresponding to the length of the sub-frame are stored in the noise codebook 6.

Figure 2:
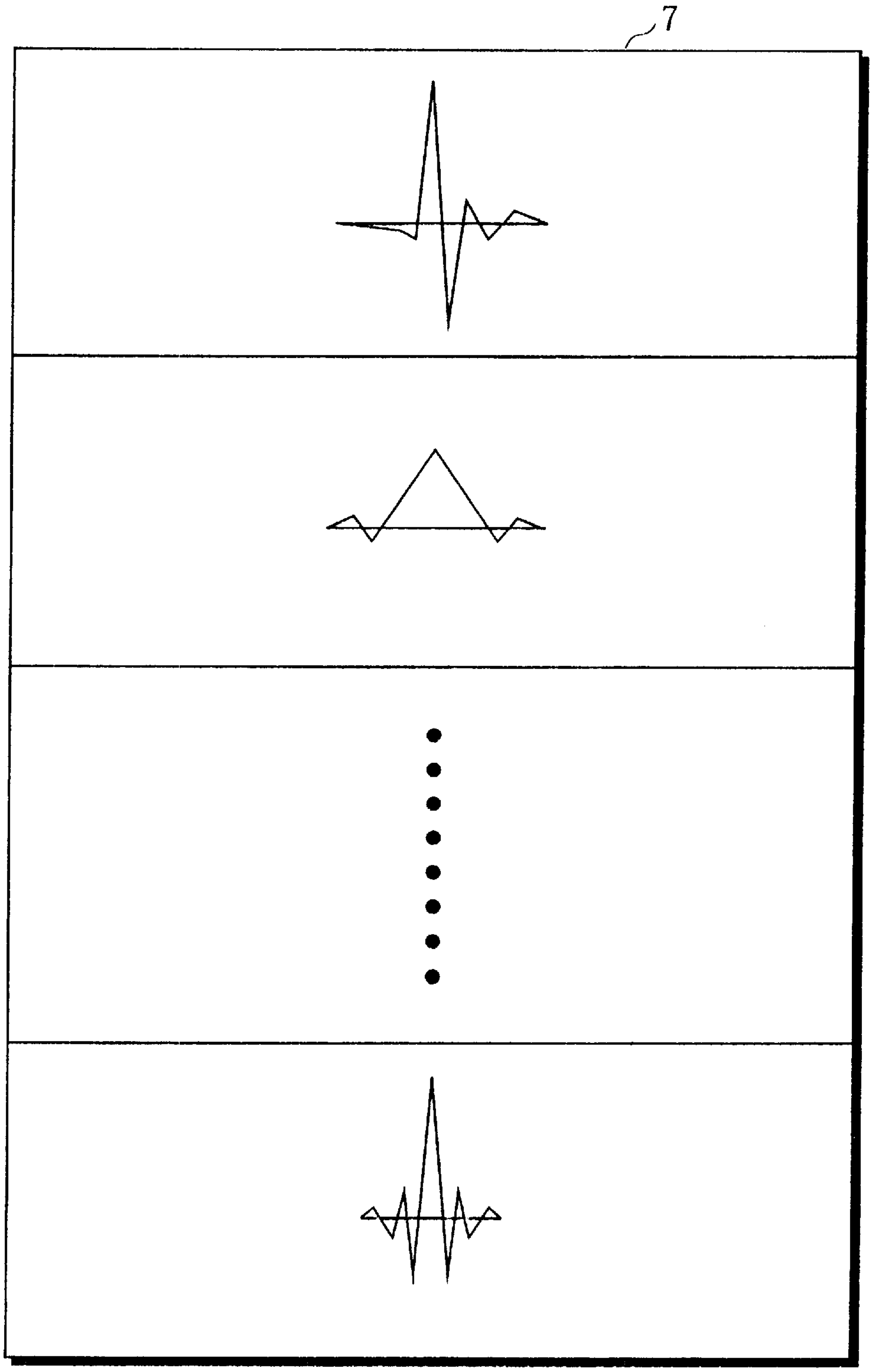
FIG. 2 is a typical diagram showing one example of the contents of a pulse codebook.

The pulse codebook 7 is used for representing a portion which is not sufficiently represented by the adaptive codebook 4 in a periodic portion of input speech. FIG. 2 illustrates an example of a plurality of codevectors (pulse codevectors) stored in the pulse codebook 7. As each of the pulse codevectors, a codevector corresponding to the pitch waveform of a typical voiced sound is used.

Description is now made of the operation of the speech coder.

A continuous input speech signal is divided into sections at predetermined spacing of approximately 40 ms. The spacing is herein referred to as a frame. A speech signal in one frame is divided into sections at predetermined spacing of approximately 8 ms. The spacing is herein referred to as a sub-frame.

(1) Linear predictive analysis and construction of linear predictive synthesis filter Input speech is first subjected to linear predictive analysis for each frame by a linear predictive analysis unit 1. In this example, linear predictive analysis is carried out twice in one frame by the linear predictive analysis unit 1, and two linear predictive coefficients of 10-th degree are found by the respective analyses. Linear predictive coefficients $\alpha_i$ (i=1, 2 . . . 10) corresponding to sub-frames in the frame are respectively found on the basis of the found linear predictive coefficients. A linear predictive synthesis filter (speech synthesis filter) 3 is constructed for each sub-frame on the basis of the linear predictive coefficient $\alpha_i$ corresponding to the sub-frame.

(2) Pitch extraction

A pitch cycle Tp of input speech is extracted for each frame by a pitch extracting unit 2.

(3) Search of codebook

The search of the adaptive codebook 4 and the fixed codebook 5 (search of the adaptive/fixed codebook) and the search of the noise codebook 6 and the pulse codebook 7 (search of the noise/pulse codebook) are made for each sub-frame.

(3-1) Search of adaptive/fixed codebook (3-1-1) Calculation of distance by adaptive codebook In the search of the adaptive/fixed codebook, the calculation of the distance is first performed by the adaptive codebook 4. In the calculation of the distance by the adaptive codebook 4, an output codevector corresponding to an input code to the adaptive codebook 4 is produced in the following manner.

An excitation signal (an adaptive codevector) of the linear predictive synthesis filter 3 in sub-frames preceding the current sub-frame which is stored in the adaptive codebook 4 is cut from its end to a length corresponding to an input code (hereinafter referred to as a lag).

When the lag is shorter than the sub-frame, an adaptive codevector obtained by the cutting is repeatedly arranged until the length thereof becomes the length of the sub-frame, whereby an output codevector is produced. When the lag is longer than the sub-frame, the adaptive codevector obtained by the cutting is cut from its head end to a length corresponding to the length of the sub-frame, whereby an output codevector is produced.

The lengths corresponding to the respective input codes (lags) differ. The lag corresponding to each of the input codes is determined on the basis of a length corresponding to the pitch cycle Tp detected by the pitch extracting unit When a length corresponding to the pitch cycle Tp detected by the pitch extracting unit 2 is taken as $L_O$, the lag corresponding to each of the input codes is a length selected within a predetermined range centered around $L_O$.

The linear predictive synthesis filter 3 is driven using the produced output codevector, whereby reproduced speech is produced. The reproduced speech is multiplied by such gain that the distance between the input speech and the reproduced speech (the distortion of the reproduced speech from the original speech) theoretically reaches a minimum, after which the distance between the input speech and the reproduced speech is calculated by a distance calculating unit 8. Such an operation is repeated for each input code to the adaptive codebook 4, after which the calculation of the distance is performed by the fixed codebook 5.

(3-1-2) Calculation of distance by fixed codebook

In the calculation of the distance by the fixed codebook 5, a fixed codevector corresponding to an input code to the fixed codebook 5 is read out. The linear predictive synthesis filter 3 is driven using the fixed codevector read out, whereby reproduced speech is produced. The reproduced speech is multiplied by such gain that the distance between the input speech and the reproduced speech theoretically reaches a minimum, after which the distance between the input speech and the reproduced speech is calculated by the distance calculating unit 8. Such an operation is repeated for each input code to the fixed codebook 5.

When the calculation of the distance by the adaptive codebook and the calculation of the distance by the fixed codebook are thus performed, an input code corresponding to an excitation vector corresponding to reproduced speech at the minimum distance from input speech and gain corresponding thereto are selected.

(3-2) Search of noise/pulse codebook (3-2-1) Calculation of distance by noise codebook In the search of a noise/pulse codebook, the calculation of the distance is first performed by the noise codebook 6. In the calculation of the distance by the noise codebook 6, a noise codevector corresponding to an input code to the noise codebook 6 is read out. In order to eliminate the effect of a codevector selected by searching the adaptive/fixed codebook, a synthesis filter output corresponding to the noise codevector read out is orthogonalized to a synthesis filter output corresponding to the codevector selected by searching the adaptive/fixed codebook, whereby reproduced speech is produced.

The reproduced speech is multiplied by such gain that the distance between the input speech and the reproduced speech theoretically reaches a minimum, after which the distance between the input speech and the reproduced speech is calculated by the distance calculating unit 8. Such an operation is repeated for each input code to the noise codebook 6, after which the calculation of the distance is performed by the pulse codebook 7.

(3-2-2) Calculation of distance by pulse codebook

In performing the calculation of the distance by the pulse codebook 7, impulse trains are first searched.

Figure 3:
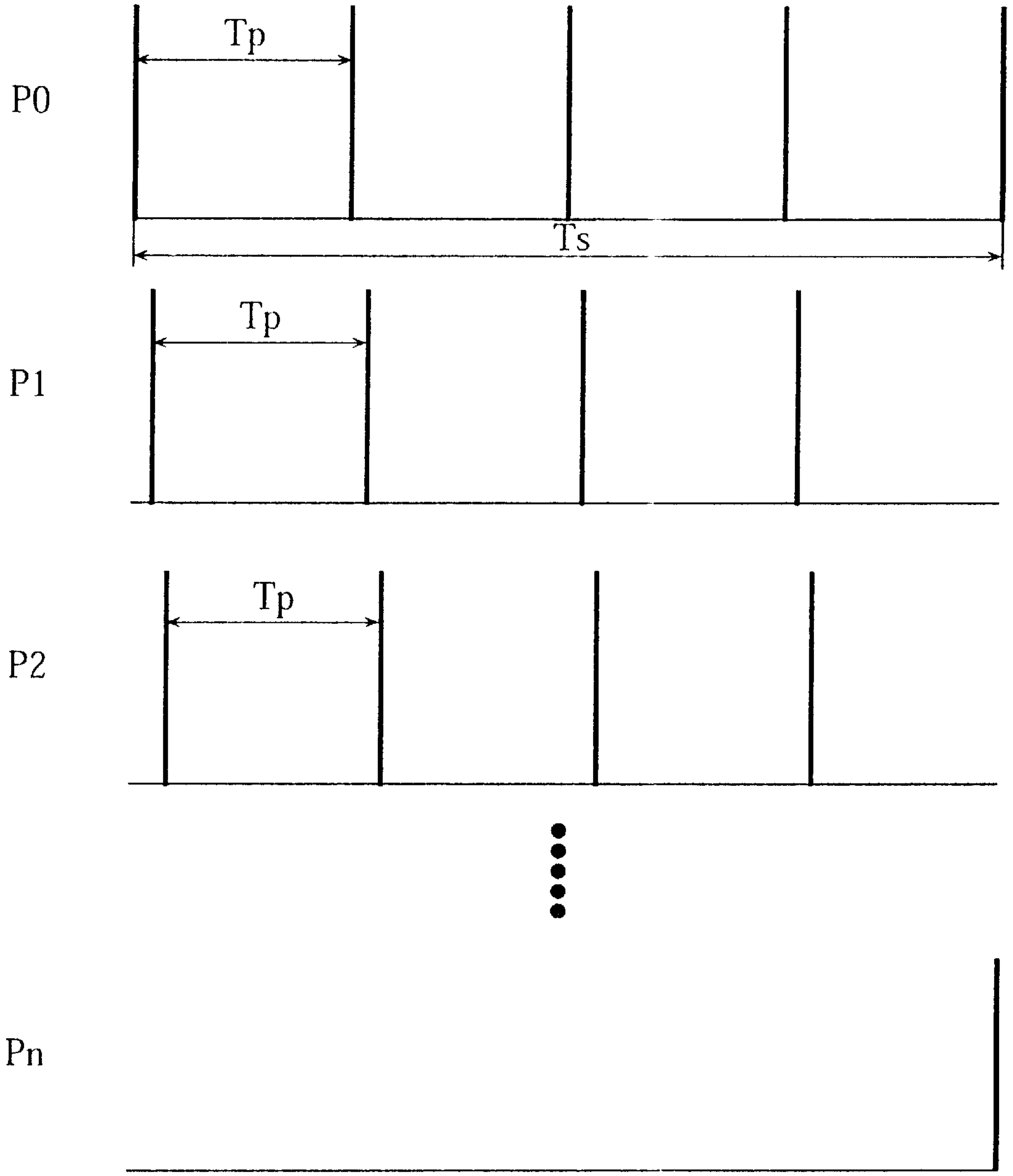
FIG. 3 is a typical diagram showing an example of an impulse train where the pitch cycle $T_p$ is smaller than the length $T_s$ of the sub-frame.

In searching impulse trains, an impulse train is first formed on the basis of a pitch cycle Tp extracted by the pitch extracting unit 2. When a length corresponding to the pitch cycle Tp extracted by the pitch extracting unit 2 is smaller than the length Ts of the sub-frame, impulses are generated at intervals of the pitch cycle extracted by the pitch extracting unit 2, and an impulse train PO whose entire length is equal to the length Ts of the sub-frame is formed, as shown in FIG. 3.

Figure 4:
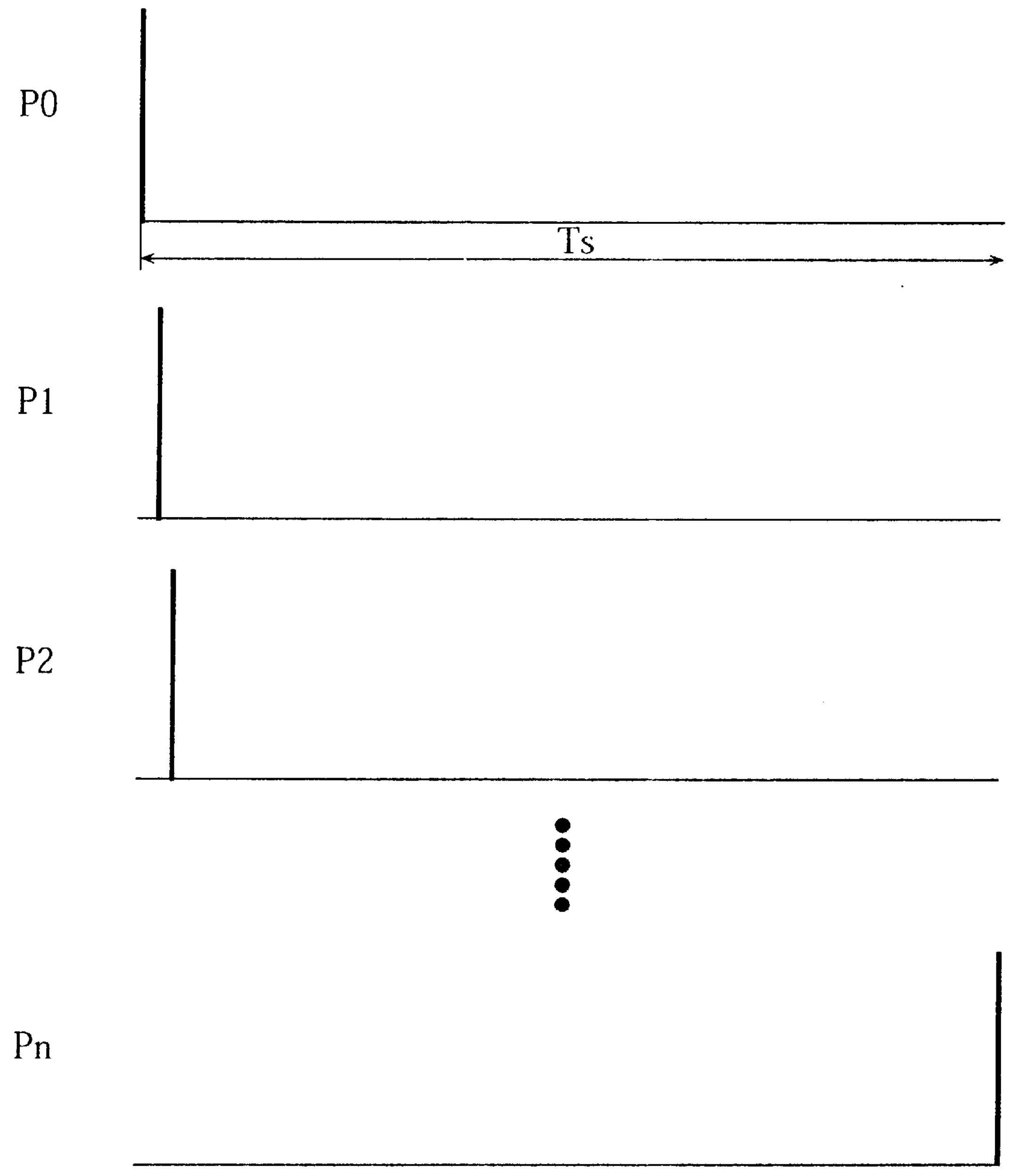
FIG. 4 is a typical diagram showing an example of an impulse train where the pitch cycle $T_p$ is larger than the length $T_s$ of the sub-frame.

When the length corresponding to the pitch cycle Tp extracted by the pitch extracting unit 2 is larger than the length Ts of the sub-frame, an impulse train PO comprising one impulse is formed, as shown in FIG. 4.

In order to eliminate the effect of the codevector selected by searching the adaptive/fixed codebook, a synthesis filter output corresponding to the produced impulse train PO is orthogonalized to a synthesis filter output corresponding to the codevector selected by searching the adaptive/fixed codebook, whereby reproduced speech is produced.

The reproduced speech is multiplied by such gain that the distance between the input speech and the reproduced speech theoretically reaches a minimum, after which the distance between the input speech and the reproduced speech is calculated by the distance calculating unit 8. Such processing is performed with respect to a plurality of impulse trains PO to Pn which differ in the initial position, as shown in FIG. 3 or 4, whereby an impulse train corresponding to reproduced speech at the minimum distance from input speech is selected.

Figure 5A:
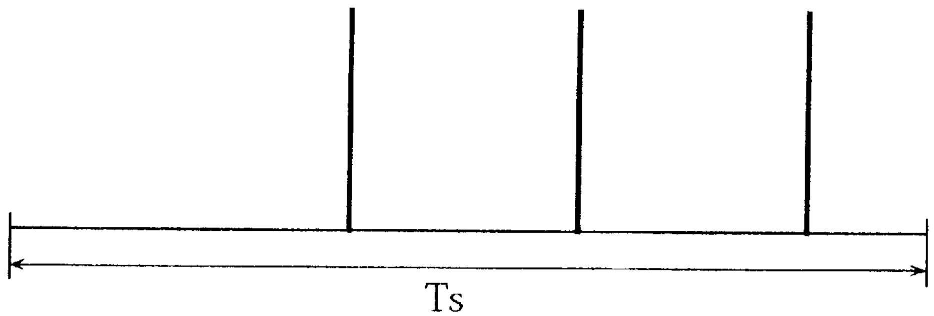
FIG. 5A and 5B are typical diagrams showing an impulse train selected by searching impulse trains and a pulse codevector produced by setting a codevector read out from a pulse codebook in the position of each of impulses in the impulse train.
Figure 5B:
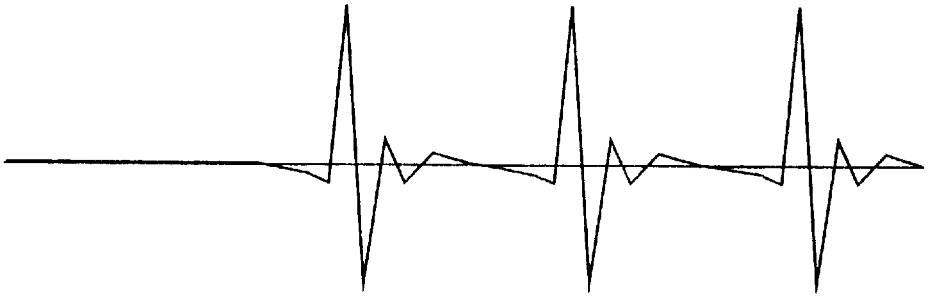
Figure 6:
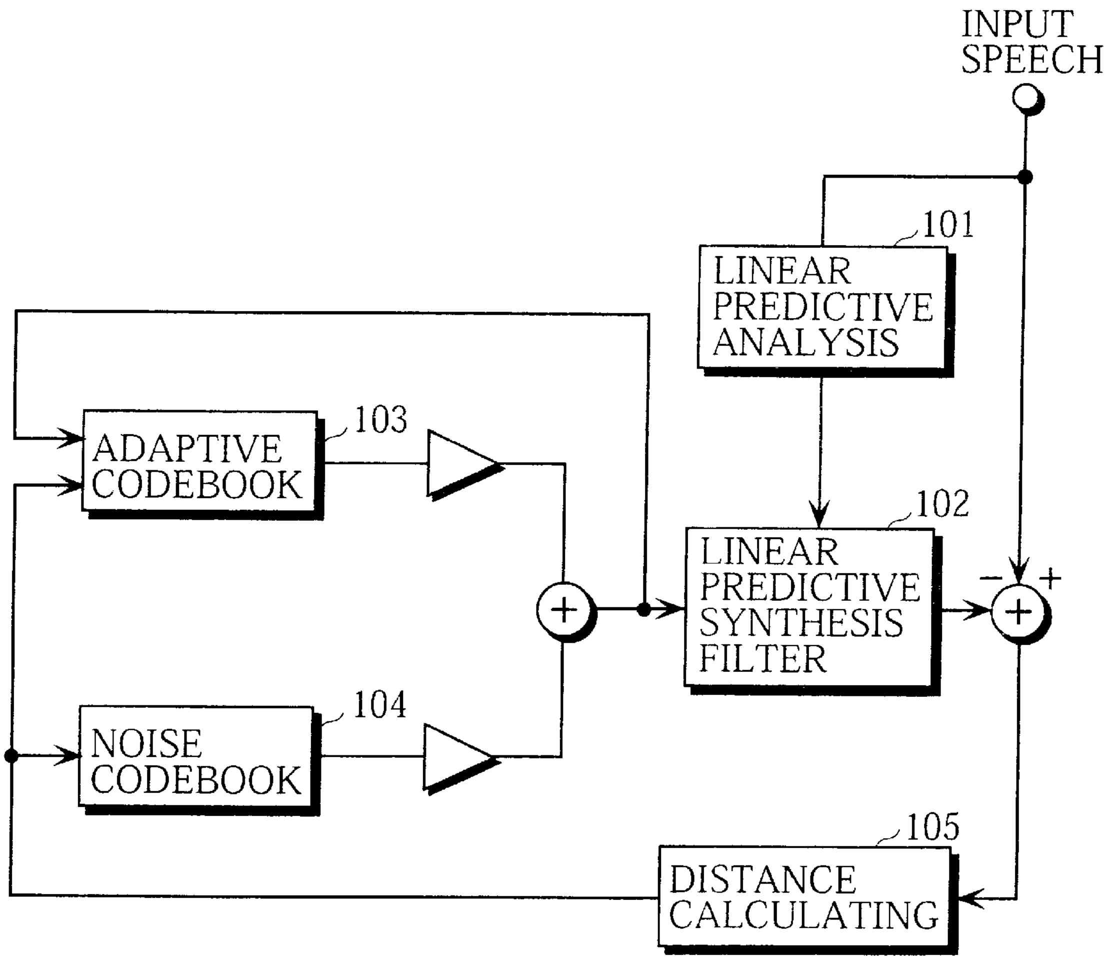
FIG. 6 (PRIOR ART)
FIG. 6 is a block diagram showing a conventional example.

Thereafter, the calculation of the distance is performed by the pulse codebook 7. In the calculation of the distance by the pulse codebook 7, a pulse codevector corresponding to an input code to the pulse codebook 7 is read out. A pulse codevector read out from the pulse codebook 7 is then set in the position of each of the impulses in an impulse train selected by searching impulse trains (see FIG. 5(*a*)), as shown in FIG. 5, for example, whereby a pulse codevector having a length corresponding to the length of the sub-frame (see FIG. 5(*b*)) is produced.

In order to eliminate the effect of the codevector selected by searching the adaptive/fixed codebook, a synthesis filter output corresponding to the produced pulse codevector is orthogonalized to the synthesis filter output corresponding to the codevector selected by searching the adaptive/fixed codebook, whereby reproduced speech is produced.

The reproduced speech is multiplied by such gain that the distance between the input speech and the reproduced speech theoretically reaches a minimum, after which the distance between the input speech and the reproduced speech is calculated by the distance calculating unit 8. Such an operation is repeated for each input code to the pulse codebook 7.

When the calculation of the distance by the noise codebook and the calculation of the distance by the pulse codebook are thus performed, an input code corresponding to an excitation vector corresponding to reproduced speech at the minimum distance from input speech and gain corresponding thereto are selected.

An input code to the adaptive codebook or the fixed codebook for each sub-frame selected by searching the adaptive/fixed codebook and a code representing gain corresponding thereto, an input code to the noise codebook or the pulse codebook for each sub-frame selected by searching the noise/pulse codebook and a code representing gain corresponding thereto, and two sets of linear predictive coefficients calculated for each frame are outputted as coded signals.

In the above-mentioned speech coder, when the current sub-frame is constituted by components different from those in the preceding sub-frame, it is considered that the following operation is performed, for example. Specifically, when the current sub-frame is constituted by components different from those in the preceding sub-frame, an input code to the fixed codebook 5 is selected by searching the adaptive/fixed codebook in the current sub-frame, whereby an input code to the pulse codebook 7 is selected by searching the noise/pulse codebook.

Therefore, a composite signal of an excitation signal based on the fixed codebook which is selected by searching the adaptive/fixed codebook and an excitation signal based on the pulse codebook which is selected by searching the noise/pulse codebook is newly stored in the adaptive codebook 4.

A code to the adaptive codebook 4 is selected in searching the adaptive/fixed codebook in the succeeding sub-frame, and a code to the noise codebook 6 is selected in searching the noise/pulse codebook.

Since in the above-mentioned embodiment, the pulse codebook 7 storing codevectors corresponding to pitch waveforms of typical voiced sounds is provided in a complementary manner to the noise codebook 6, a portion which is not sufficiently represented by the adaptive codebook in a periodic portion of the input speech can be efficiently represented. As a result, the quality of the reproduced speech is improved.

Since a pulse codevector read out from the pulse codebook 7 is caused to have periodicity so as to correspond to the pitch cycle of the input speech on the basis of the results of the search of simple impulse trains, processing time for causing the pulse codevector read out from the pulse codebook 7 to have periodicity is shortened.

In the search of the adaptive/fixed codebook and the search of the noise/pulse codebook, the distance may be calculated on the basis of a value obtained by passing the difference between the original speech and the reproduced speech through a filter corresponding to masking characteristics (a perceptual weighting filter). Alternatively, the distance may be calculated on the basis of the difference between a value obtained by passing the original speech through the perceptual weighting filter and a value obtained by passing the reproduced speech through the perceptual weighting filter.

The perceptual weighting filter is a filter having such characteristics that distortion in a portion where speech power is large is given a light weight and distortion in a portion where speech power is small is given a heavy weight on the frequency axis. The masking characteristics are such characteristics that if a frequency component is large, a human being does not easily hear a sound having a frequency close thereto according to the sense of hearing of the human being.

Although in the above-mentioned embodiment, speech is coded using the linear predictive synthesis filter 3, coding of speech may be realized by previously storing waveforms of past reproduced speech in the adaptive codebook 4 and causing the pulse codebook 7 to have pitch waveforms at a speech waveform level without using the linear predictive synthesis filter 3.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. The speech coder for subjecting input speech to linear predictive analysis to construct a speech synthesis filter, reproducing speech on the basis of codevectors stored in a codebook and the speech synthesis filter, and coding the input speech on the basis of the reproduced speech and the input speech, wherein there is provided a pulse codebook storing a plurality of types of codevectors corresponding to pitch waveforms of voiced sounds, and in producing reproduced speech on the basis of a codevector read out from the pulse codebook, the reproduced speech corresponding to each of a plurality of types of impulse trains in which impulses are generated at intervals of the pitch cycle of the input speech and the impulse trains differ from each other in their initial positions, an impulse train corresponding to the reproduced speech whose distortion from the input speech reaches a minimum is selected, and the codevector read out from the pulse codebook is caused to have periodicity on the basis of the selected impulse train.

2. A speech coder for subjecting input speech to linear predictive analysis to construct a speech synthesis filter, reproducing speech on the basis of codevectors read out from a codebook including an adaptive codebook storing codevectors corresponding to a past excitation signal and a noise codebook storing codevectors corresponding to noises and the speech synthesis filter, and coding the input speech on the basis of the reproduced speech and the input speech, wherein a pulse codebook storing a plurality of types of codevectors corresponding to pitch waveforms of voiced sounds is provided in a complementary manner to the noise codebook.

3. The speech coder according to claim 2, wherein in producing reproduced speech on the basis of the codevector read out from the pulse codebook, the reproduced speech corresponding to each of a plurality of types of impulse trains in which impulses are generated at intervals of the pitch cycle of the input speech and the impulse trains differ from each other in their initial positions, an impulse train corresponding to the reproduced speech whose distortion from the input speech reaches a minimum is selected, and the codevector read out from the pulse codebook is caused to have periodicity on the basis of the selected impulse train.

4. A speech coder comprising:

means for subjecting input speech to linear predictive analysis to construct a speech synthesis filter in the speech coder;

first searching means in the speech coder for successively cutting off a plurality of codevectors by changing the cutting position from an adaptive codebook storing codevectors corresponding to a past excitation signal, driving the speech synthesis filter using each of the cut codevectors to produce reproduced speech corresponding to the cut codevectors, and searching for the codevector corresponding to the reproduced speech whose distortion from the input speech reaches a minimum, and second searching means in the speech coder for successively reading out the codevectors from a noise codebook storing a plurality of types of codevectors corresponding to noises and a pulse codebook storing a plurality of types of codevectors corresponding to pitch waveforms of voiced sounds, producing, on the basis of each of the codevectors read out and the speech synthesis filter, reproduced speech corresponding to the codevector read out, and searching for the codevector corresponding to the reproduced speech whose distortion from the input speech reaches a minimum.

5. The speech coder according to claim 4, wherein the second searching means includes means for producing reproduced speech on the basis of the codevector read out from the pulse codebook, the reproduced speech corresponding to each of a plurality of types of impulse trains in which impulses are generated at intervals of the pitch cycle of the input speech and the impulse trains differ from each other in their initial positions, selecting the impulse train corresponding to the reproduced speech whose distortion from the input speech reaches a minimum, and causing the codevector read out from the pulse codebook to have periodicity on the basis of the selected impulse train.

6. A speech coder comprising:

means for subjecting input speech to linear prediction analysis to construct a speech synthesis filter in the speech coder;

first searching means in the speech coder for successively cutting off a plurality of types of codevectors by changing the cutting position from an adaptive codebook storing codevectors corresponding to a past excitation signal, driving the speech synthesis filter using each of the cut codevectors to produce reproduced speech corresponding to the cut codevectors, calculating the distortion of the reproduced speech from the input speech, and successively reading out the codevectors from a fixed codebook storing a plurality of types of codevectors, driving the speech synthesis filter using the codevectors read out to produce reproduced speech corresponding to each of the codevectors read out, calculating the distortion of the reproduced speech from the input speech, and searching for the codevector corresponding to the reproduced speech whose distortion from the input speech reaches a minimum out of the codevectors cut from the adaptive codebook and the codevectors read out from the fixed codebook, and second searching means in the speech coder for successively reading out the codevectors from a noise codebook storing a plurality of types of codevectors corresponding to noises and a pulse codebook storing a plurality of types of codevectors corresponding to pitch waveforms of voiced sounds, producing reproduced speech corresponding to each of the codevectors read out on the basis of the codevectors read out and the speech synthesis filter, and searching for a code corresponding to the codevector corresponding to the reproduced speech whose distortion from the input speech reaches a minimum.

7. The speech coder according to claim 6, wherein the second searching means includes means for producing reproduced speech on the basis of the codevector read out from the pulse codebook, the reproduced speech corresponding to each of a plurality of types of impulse trains in which impulses are generated at intervals of the pitch cycle of the input speech and the impulse trains differ from each other in their initial positions, selecting the impulse train corresponding to the reproduced speech whose distortion from the input speech reaches a minimum, and causing the codevector read out from the pulse codebook to have periodicity on the basis of the selected impulse train.

8. The speech coder for reproducing speech on the basis of codevectors stored in a codebook and coding, on the basis of the reproduced speech and input speech, the input speech, wherein there is provided a pulse codebook storing a plurality of types of codevectors corresponding to pitch waveforms of voiced sounds, and in producing reproduced speech on the basis of a codevector read out from the pulse codebook, the reproduced speech corresponding to each of a plurality of impulse trains in which impulses are generated at intervals of the pitch cycle of the input speech and the impulse trains differ from each other in their initial positions, the impulse train corresponding to the reproduced speech whose distortion from the input speech reaches a minimum is selected, and the codevector read out from the pulse codebook is caused to have periodicity on the basis of the selected impulse train.

9. A speech coder for reproducing speech on the basis of codevectors read out from a codebook including an adaptive codebook storing codevectors corresponding to a past reproduction signal and a noise codebook storing codevectors corresponding to noises, and coding, on the basis of the reproduced speech and input speech, the input speech, wherein a pulse codebook storing a plurality of types of codevectors corresponding to pitch waveforms of voiced sounds is provided in a complementary manner to the noise codebook.

10. The speech coder according to claim 9, wherein in producing reproduced speech on the basis of the codevector read out from the pulse codebook, the reproduced speech corresponding to each of a plurality of impulse trains in which impulses are generated at intervals of the pitch cycle of the input speech and the impulse trains differ from each other in their initial positions, the impulse train corresponding to the reproduced speech whose distortion from the input speech reaches a minimum is selected, and the codevector read out from the pulse codebook is caused to have periodicity on the basis of the selected impulse train.

11. A speech coder comprising:

first searching means in the speech coder for successively cutting off a plurality of codevectors by changing the cutting position from an adaptive codebook storing codevectors corresponding to a past reproduction signal, to produce reproduced speech corresponding to each of the cut codevectors, and searching for the codevector corresponding to the reproduced speech whose distortion from the input speech reaches a minimum, and second searching means in the speech coder for successively reading out the codevectors from a noise codebook storing a plurality of types of codevectors corresponding to noises and a pulse codebook storing a plurality of types of codevectors corresponding to pitch waveforms of voiced sounds, producing reproduced speech corresponding to each of the codevectors read out, and searching for the codevector corresponding to the reproduced speech whose distortion from the input speech reaches a minimum.

12. The speech coder according to claim 11, wherein the second searching means includes means for producing reproduced speech on the basis of the codevector read out from the pulse codebook, the reproduced speech corresponding to each of a plurality of types of impulse trains in which impulses are generated at intervals of the pitch cycle of the input speech and the impulse trains differ from each other in their initial positions, selecting the impulse train corresponding to the reproduced speech whose distortion from the input speech reaches a minimum, and causing the codevector read out from the pulse codebook to have periodicity on the basis of the selected impulse train.

13. A speech coder comprising:

first searching means in the speech coder for successively cutting off a plurality of types of codevectors by changing the cutting position from an adaptive codebook storing codevectors corresponding to a past excitation signal, to produce reproduced speech corresponding to each of the cut codevectors, calculating the distortion of the reproduced speech from the input speech, and successively reading out the codevectors from a fixed codebook storing a plurality of types of codevectors, to produce reproduced speech corresponding to each of the codevectors read out, calculating the distortion of the reproduced speech from the input speech, and searching for the codevector corresponding to the reproduced speech whose distortion from the input speech reaches a minimum out of the codevectors cut off from the adaptive codebook and the codevectors read out from the fixed codebook, and second searching means in the speech coder for successively reading out the codevectors from a noise codebook storing a plurality of types of codevectors corresponding to noises and a pulse codebook storing a plurality of types of codevectors corresponding to pitch waveforms of voiced sounds to produce reproduced speech corresponding to each of the codevectors read out, and searching for a code corresponding to the codevector corresponding to the reproduced speech whose distortion from the input speech reaches a minimum.

14. The speech coder according to claim 13, wherein the second searching means includes means for producing reproduced speech on the basis of the codevector read out from the pulse codebook, the reproduced speech corresponding to each of a plurality of types of impulse trains in which impulses are generated at intervals of the pitch cycle of the input speech and the impulse trains differ from each other in their initial positions, selecting the impulse train corresponding to the reproduced speech whose distortion from the input speech reaches a minimum, and causing the codevector read out from the pulse codebook to have periodicity on the basis of the selected impulse train.

* * * * *